United States Patent [19]

Kaneko et al.

[11] Patent Number: 5,109,501
[45] Date of Patent: Apr. 28, 1992

[54] DATA TRANSFER APPARATUS HAVING A TRANSFERABLE DATA COUNTER

[75] Inventors: Katsuyuki Kaneko, Osaka; Yuji Tanikawa, Hirakata, both of Japan

[73] Assignee: Matsushita Electric Industrial Co., Ltd., Osaka, Japan

[21] Appl. No.: 460,267

[22] Filed: Jan. 2, 1990

Related U.S. Application Data

[63] Continuation of Ser. No. 107,634, Oct. 13, 1987, abandoned.

[30] Foreign Application Priority Data

Oct. 13, 1986 [JP] Japan ................. 61-242477
Oct. 13, 1986 [JP] Japan ................. 61-242478

[51] Int. Cl.$^5$ ............................................. G06F 13/00
[52] U.S. Cl. .......................... 395/425; 364/DIG. 1; 364/242.3; 364/260; 364/260.1
[58] Field of Search ... 364/200 MS File, 900 MS File

[56] References Cited

U.S. PATENT DOCUMENTS

| | | | |
|---|---|---|---|
| 3,629,848 | 12/1971 | Gibson | 364/200 |
| 4,065,810 | 12/1977 | Cramer et al. | 364/200 |
| 4,156,904 | 5/1979 | Minowa et al. | 364/200 |
| 4,419,728 | 12/1983 | Larson | 364/200 |
| 4,543,627 | 9/1985 | Schwab | 364/200 |

Primary Examiner—Eddie P. Chan
Attorney, Agent, or Firm—Wenderoth, Lind & Ponack

[57] ABSTRACT

A data transfer apparatus is capable of DMA-transferring the transferable data sequentially generated by a processor. In the data transfer apparatus is provided a counter or an address latch for storing data corresponding to the upper limit (or lower limit) of the address of the transferable data. The content of this counter or latch and the content of the DMA address counter are sequentially compared and transferred, and when these values finally become equal to each other and there is no longer new transferable data, the DMA transfer is stopped and a transfer request is retained. By this constitution, the data transfer between the processor and a device which requires the data generated by the processor may be done instantly and asynchronously.

3 Claims, 5 Drawing Sheets

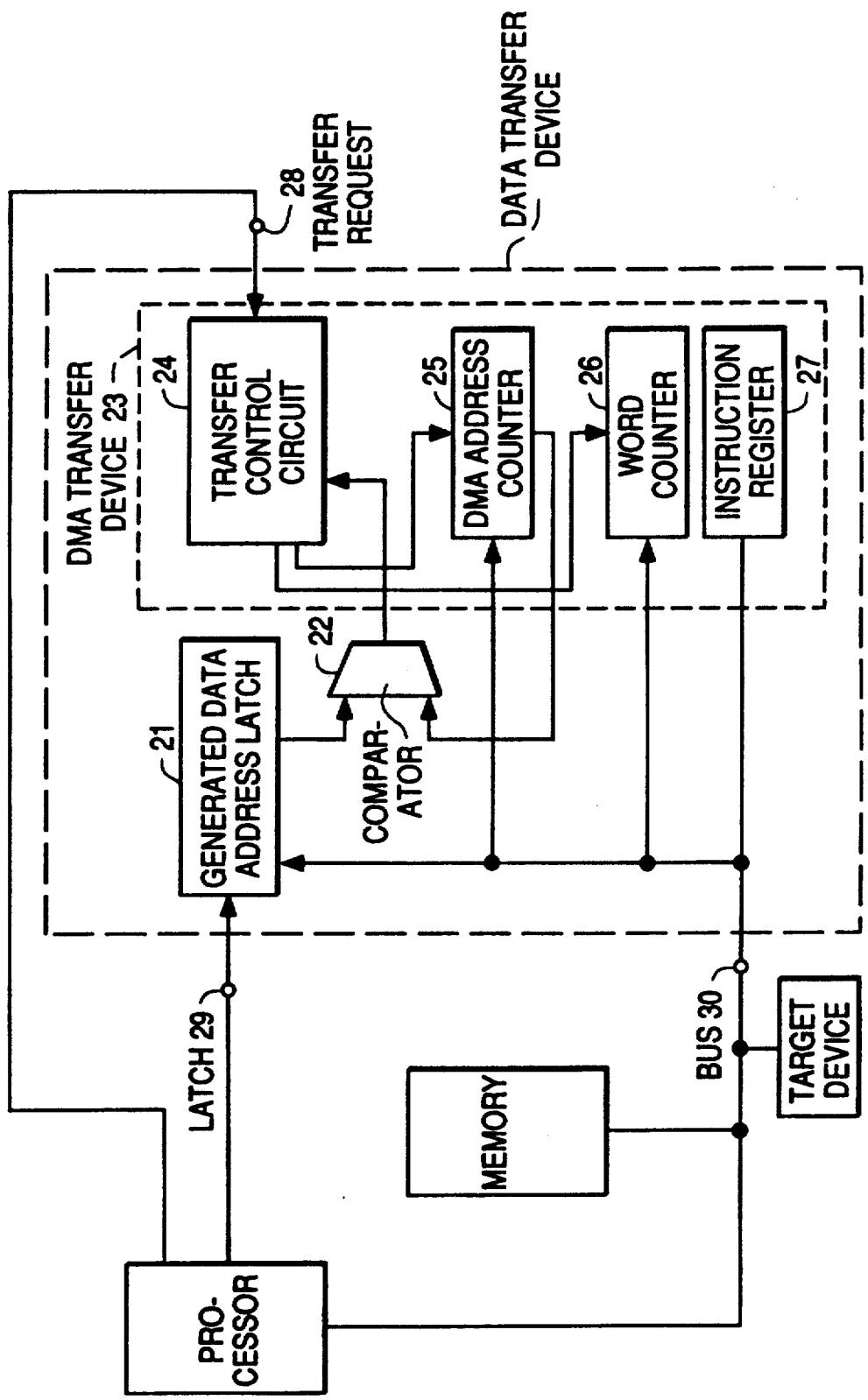

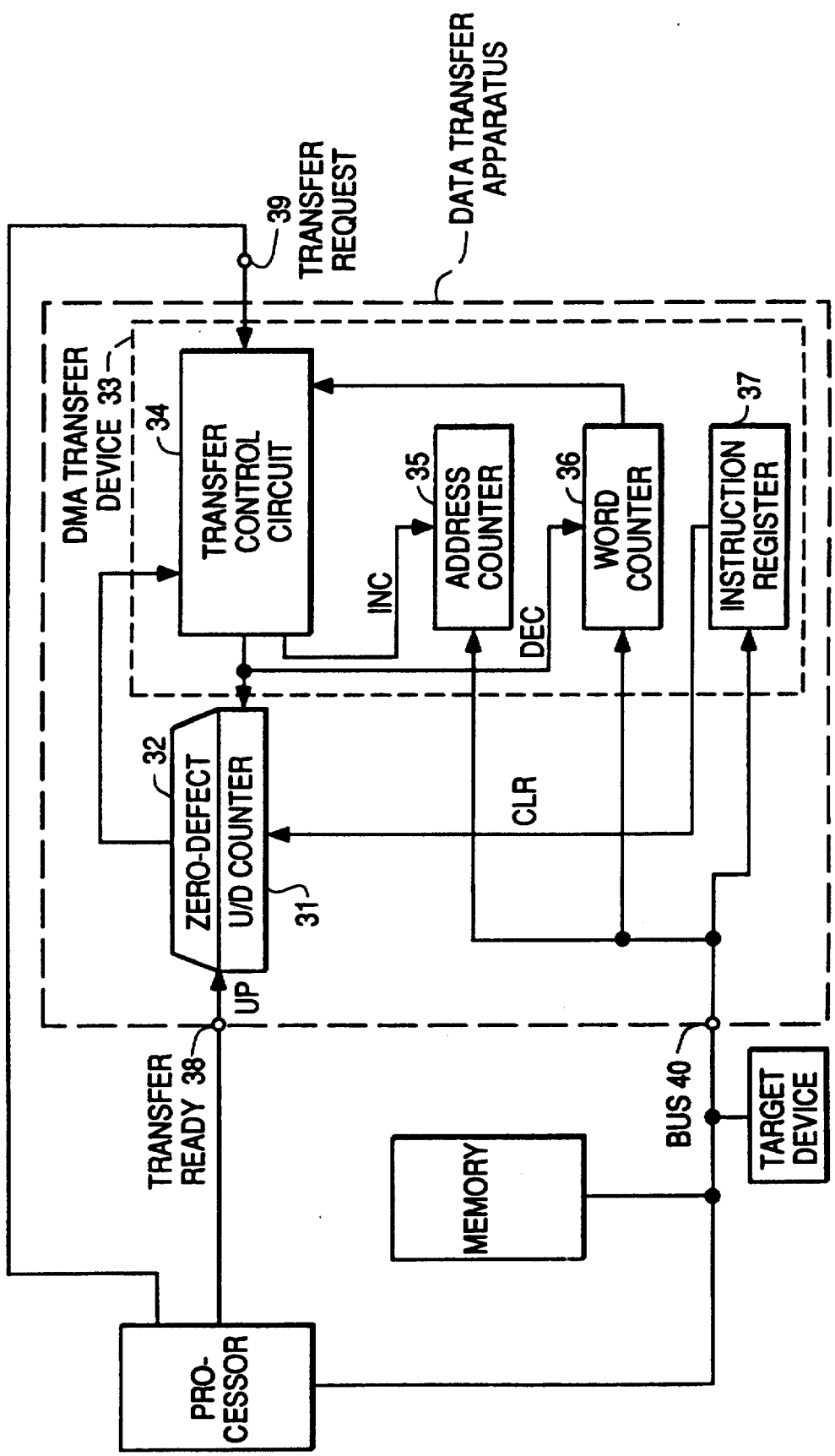

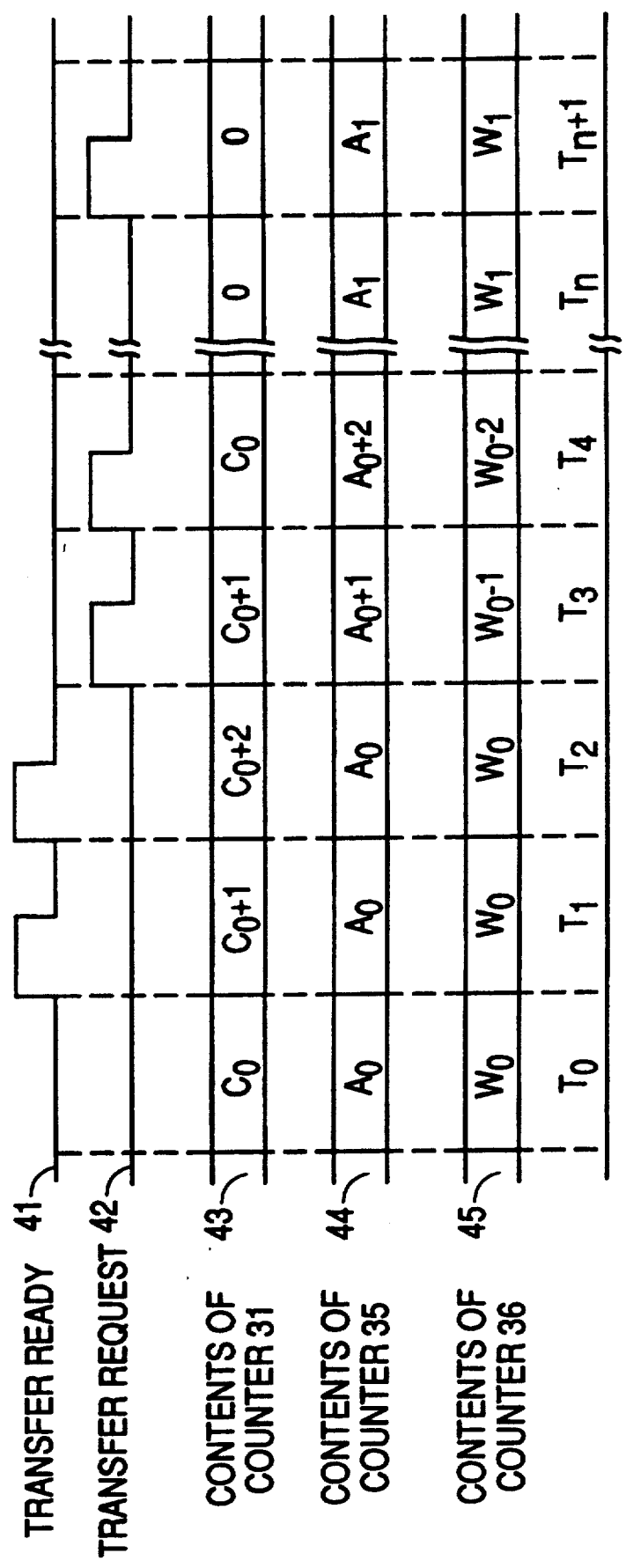

DATA TRANSFER APPARATUS HAVING A TRANSFERABLE DATA COUNTER

This application is a continuation division of now abandoned application, Ser. No. 07/107,634 filed on Oct. 13, 1987.

BACKGROUND OF THE INVENTION

This invention relates to a data transfer apparatus, and more particularly to an apparatus for performing the transfer of a data group continuously placed on the memory without depending on the direct operation of the CPU, or a so-called DMA (direct memory access) controller.

Generally, in data transfer between processors in a multiprocessor system not sharing a bus, or in data transfer to a device on a bus operating asynchronously, a DMA controller is usually employed. In the data transfer using a DMA controller, the task relating to the generation of the transfer data is completed in the processor, and all transfer data are generated. In the next step, the DMA controller is started by an instruction from the transfer destination (usually the processor), and the DMA transfer is effected according to the request from the transfer destination.

That is, until all transfer data are generated, the data will not be effectively utilized in the next task. Accordingly, in order to improve the efficiency of the next task by transferring the data at high speed, it is useful and thus effective to transfer part of the data being generated even in the midst of the task which is processed at the processor.

Such examples are high speed pipelined processing between processors in the multiprocessor system, or data exchange between processors in the processor array.

In such cases it is difficult to apply the conventional DMA controller directly.

Supposing that, for example, data A(l) to A(n), where n is greater than l, are processed on a task A in a certain processor to generate new data A(l) to A(n), which are used on a proceeding task B in another processing system (for example, another processor). At a time before said task A is over, the new data A(l) to A(k), where k is more than l, have been sequentially processed on the task A. Then, if it is attempted to transfer the new data A(l) to A(k) by using the DMA controller, it is difficult to distinguish the range in which the data has been renewed, that is, the address range of the memory in which the data can be used on the next task.

Accordingly, in general, there were two conventional methods used mainly as a means of generating data to a device operating asynchronously and setting in a transferrable state at the same time.

The first method is to dispose an FIFO (first-in first-out) memory between the device at the transfer destination and the bus, and transfer the data through it. In this case, the processor stores in both the memory and the FIFO memory.

In the second method, a special control circuit (a hardware semaphore) containing registers is provided between the processor and the DMA controller. The control circuit and the processor rewrites the values in the registers when transferring data, and the control circuit starts and stops the DMA controller in accordance with the value in the register. However, in the first method, it is necessary to prepare an FIFO memory of a capacity corresponding to the transfer data quantity. In the second method, it is necessary to add complicated hardware to control the memory access of the processor and the DMA controller. In general, these conventional data transfer apparatus were not necessarily compact and functional.

SUMMARY OF THE INVENTION

It is hence a primary object of this invention to transfer sequentially generated data instantly by adding a simple hardware configuration to a conventional data transfer apparatus, for example, DMA controller.

In order to achieve the above object, a counter or an address latch for storing the upper limit (or the lower limit) of the address of the data which can be transferred is provided, in the data transfer apparatus. The value of the counter or the address latch is updated in synchronism with the generation of the transfer data.

For example, when using a counter, depending on the number of pieces of the data being generated and transferrable, the counter is successively increased from the initial state. When the data is transferred to the next processing system by the DMA controller, this counter is decreased. And when the counter value becomes 0 (initial state), the DMA transfer is stopped, and the DMA controller waits until new transferable data are generated on the task, that is the counter-up of the counter.

When using an address latch, the processor generates transferable data on the task of a certain program and stores the data in the memory, then the storing address is read into this address latch at the same time. By comparing the content of the address latch with the content of the source address counter usually provided in the DMA controller, the new transferable data generated in the midst of task processing can be transferred.

That is, even in the midst of the task, the latest transferable data may be always sent to the next processing system by storing the boundary address or the number of the data which corresponds to the data processed to be newly transferable or sequentially stored and by comparing these address or the number with the value of the source address register of the DMA controller.

While the novel features of the invention are set forth with particularity in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3 is a block diagram of a data transfer apparatus having an address latch as an address holding device in the composition of a second embodiment of this invention;

FIG. 4 is a block diagram of a data transfer apparatus using a counter as an address holding device so as to keep a difference from a DMA address counter in the composition of a third embodiment of this invention; and FIG. 5 is a timing chart showing the operation of the data transfer apparatus in the composition of the third embodiment.

DETAILED DESCRIPTION OF THE INVENTION

Figure 1:
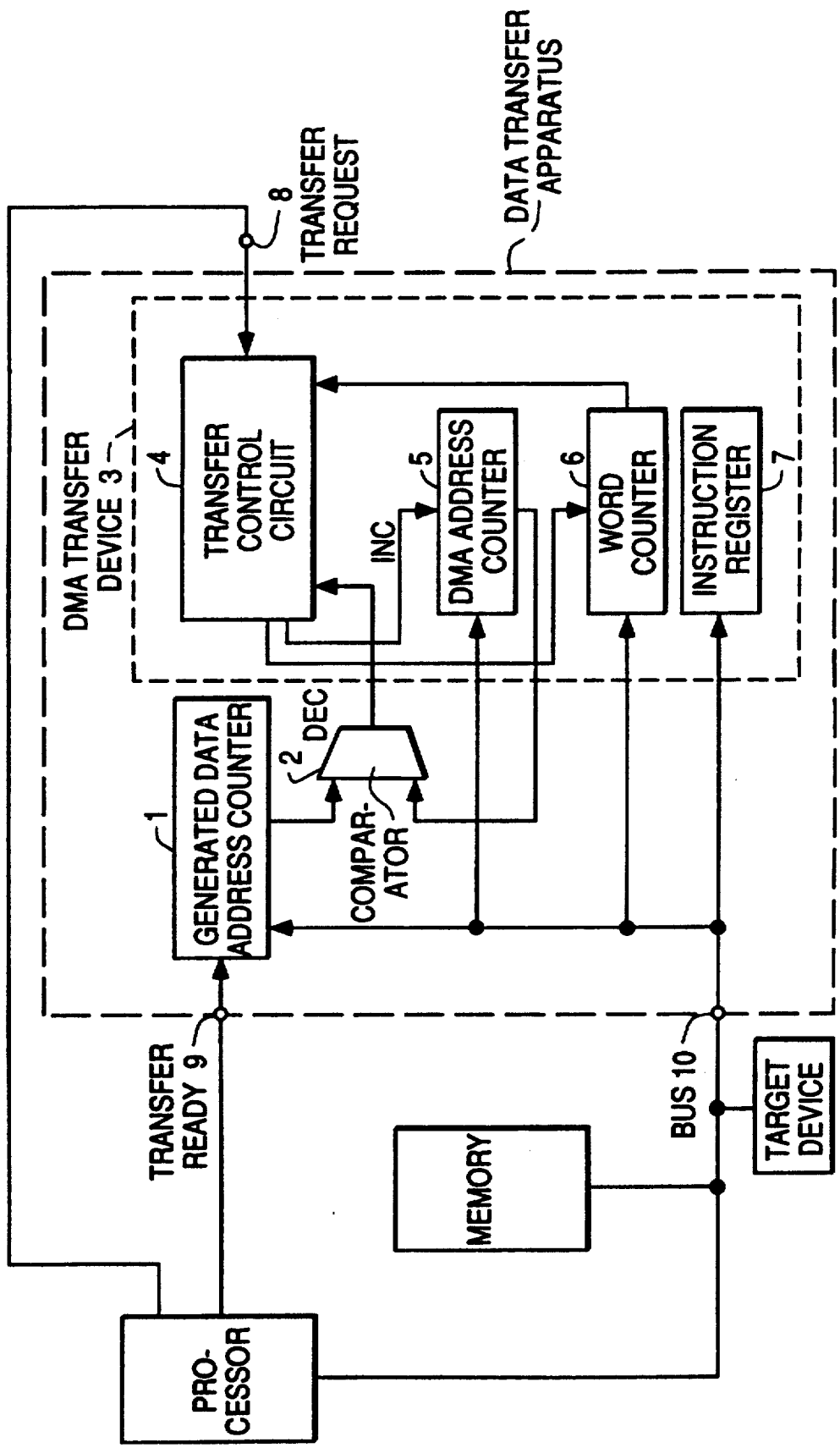
FIG. 1 is a block diagram of a data transfer apparatus having a counter as an address holding device in the composition of a first embodiment of this invention.

Referring now to FIG. 1, a first embodiment of a data transfer apparatus of this invention is described below. In FIG. 1, numeral 1 denotes a generated data address counter, 2 denotes a comparator, and 3 denotes a DMA transfer device. The DMA transfer device 3 is composed of a transfer control circuit 4, a DMA address counter 5 for indicating the source address on the memory in DMA transfer, a word counter 6 for indicating the number of pieces of transfer data in DMA transfer, and an instruction register 7.

The transfer control circuit 4 conducts DMA transfer by a request signal on a transfer request signal line 8, and adds +1 to the DMA address counter 5 at every transfer of one word, and adds −1 to the word counter 6. Therefore, the end of the DMA transfer is known when the word counter 6 becomes zero.

Additionally, the generated data address counter 1 first sets the DMA transfer start address through bus 10 prior to DMA transfer. Then, to indicate the boundary of the address to which the data is at present transferable from the transfer start address, every time a piece of data is processed by the processor to be a new transferable data, 1 pulse of transfer ready signal 9 is generated, and the value of the generated address counter 1 in which the transfer start address is stored is increased by 1 successively.

In this way, the generated data address counter 1 always indicates the upper limit of the transferable data addresses.

The comparator 2 compares the value DC1 of the generated data address counter 1 and the value AC5 of the DMA address counter 5 indicating the source address of the transfer, and delivers the results to the transfer control circuit 4.

In the transfer control circuit 4, if DC1 is greater than AC5 (the transfer address by DMA transfer device 3 is smaller than the address of the transferable data processed by the processor, that is, there is transferable data), the transfer action is effected depending on the state of the transfer request signal line 8 as the output of the comparator 2 is not zero. If DC1 is equal to AC5 (the transfer address coincides with the transferable data address, and there is no transferable data), the DMA transfer action is prohibited as the output of the comparator 2 is zero. If the data transfer is requested in the described situation, a holding state is kept until the transferable data is generated and the generated data address counter 1 is updated.

Figure 2:
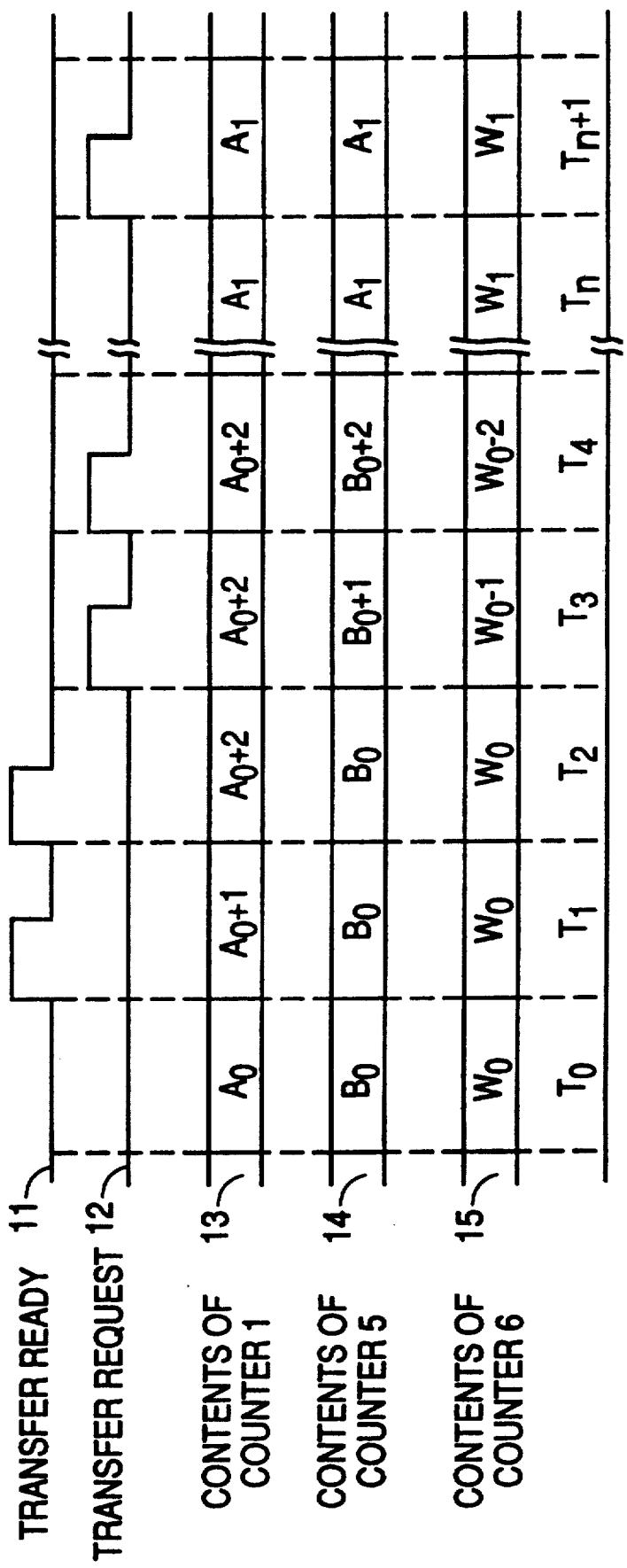
FIG. 2 is a timing chart showing the operation of the data transfer apparatus in the composition of the first embodiment.

Next, the operation of the data transfer apparatus shown in FIG. 1 is explained referring to FIG. 2. FIG. 2 shows the input signals and contents of several counters in the data transfer apparatus shown in FIG. 1, with the passing of the time, in which numerals 11 and 12 denote signals on a transfer ready line 9 and a transfer request line 8, respectively, 13 to 15 denote contents of the generated data address counter 1, DMA address counter 5, and word counter 6, respectively.

Suppose, for example, at time $T_0$, the values of the generated data address counter 1, DMA address counter 5, and word counter 6 are respectively $A_0$, $B_0$ ($A_0$ is greater than $B_0$), and $W_0$ (greater than 2). That is, two words are still left over as transferable data.

At time $T_1$, when transferable data is generated in the processor and a transfer ready signal is set out, +1 is added to the value of the generated data address counter 1 to become ($A_0+1$). At time $T_2$ a transfer ready signal is sent out again and the value of the generated data address counter 1 becomes ($A_0+2$). (In this example, two words are increased as transferable data newly. That is, when n words, n being not less than 1, are increased, the final value of the generated data address counter 1 becomes $A_0+n$).

Furthermore, at time $T_3$, when a transfer request is issued from the transfer destination device, the transfer control circuit 4 in the DMA transfer device 3 confirms the transfer ready state from the output $(A_0+2)-B_0>0$ of the comparator 2, and performs DMA transfer of one piece of data. At the same time +1 is added to the DMA address counter 5, and −1 is added to the word counter 6. As a result, the contents of the counters becomes $A_0+2$, $B_0+1$, and $W_0-1$, respectively. At time $T_4$, when a transfer request is sent out again, the same process as that at time $T_3$ is carried out, and the values of the respective counters become $A_0+2$, $B_0+2$ and $W_0-2$.

As these processes are repeated, the value AC5 of the DMA address counter 5 indicating the address of the transfer data approaches gradually the value DC1 of the generated data address counter 1 which shows the maximum limit address of the transferable new data. Also the number of transferable words nears zero.

Finally, for example, at time $T_n$, $T_{n+1}$, when the contents of the generated data address counter 1 and DMA address counter 5 both become Al, the output of the comparator 2 becomes zero. Therefore, if a transfer request is input at time $T_n$, the transfer control circuit 4 detects that the output of the comparator 2 is zero, and the DMA action is not initiated, and the transfer request is retained.

FIG. 3 is a block diagram showing a second embodiment of a data transfer apparatus of this invention. In FIG. 3, numerals 22 to 38, 30 correspond to the designations of numerals 2 to 8, 11 in FIG. 1, 21 denotes a generated data address latch, and 29 denotes an input signal line of the latch.

When a latch signal is sent out, the generated data address latch 21 latches the address signal on the bus 30. What is different from the first embodiment shown in FIG. 1 is that the addresses of the transferable data to be delivered to the bus 30 by the processor to store the data into the memory are sequentially taken into the generated data address latch 21 directly by the latch signal, without using a counter or the like, in order to obtain the address upper limit of the transferable data. In the situation described above, as for the address signal on the bus, the address signal may be latched in synchronism with the time of storing of the data into the memory by the processor, or this address may be transferred to the latch 21 as data. Excluding the aforementioned difference, the operation of the second embodiment is same as that of the first embodiment shown in FIG. 1.

FIG. 4 is a block diagram showing a third embodiment of a data transfer apparatus of this invention. In FIG. 4, numeral 31 denotes an up/down counter (abbreviated U/D counter hereinafter), 32 denotes a zero-detect circuit of the U/D counter 31, and 33 denotes a DMA transfer device. The DMA transfer device 33 is composed of transfer control circuit 34, address counter 35, word counter 36, and instruction resistor 37. At every 1 DMA transfer, +1 is added to the address counter 35, and −1 is added to the word counter 36 and the U/D counter 31.

The end of DMA transfer is detected when the word counter 36 becomes zero. The U/D counter 31 is added by +1 each successively depending on the number of pulse signals on the transfer ready signal line 38 from outside.

The transfer request to the DMA transfer device 33 is effected by the signal on the transfer request signal line 39, and one piece of data is transferred by one transfer request. The output of the zero-detect circuit 32 is sent to the transfer control circuit 34, and while this value is true (that is, while zero is being detected), the DMA transfer action is prohibited, and the transfer request is retained. On the other hand, while this value is false (that is, not zero), the DMA transfer action is started up depending on the transfer request. The content of the U/D counter 31 is cleared by the instruction stored in the instruction register 37.

The operation of the data transfer apparatus shown in FIG. 4 is explained below while referring to FIG. 5. FIG. 5 is a diagram showing the contents of the input signal and counters in the data transfer apparatus shown in FIG. 4, with the passing of the time, in which numerals 41, 42 denote signals on the transfer ready signal line 38 and transfer request signal line 39, 43 to 45 are contents of the U/D counter 31, address counter 35, and word counter 36, respectively.

For example, at time $T_0$, suppose the values of the U/D counter 31, address counter 35 and word counter 36 are respectively $C_0$ (greater than 0), $A_0$, $W_0$ (greater than 2). That is, at this time already, $C_0$ pieces of transferable data are generated, but transfer request from the transfer destination device is not issued yet.

In this state, at time $T_1$, when one piece of transferable data is generated in the processor, and 1 pulse of transfer ready signal is sent out, the value of the U/D counter 31 is added by +1 to become $C_0+1$. At time $T_2$, furthermore, when a transfer ready signal is sent out, the value of the U/D counter 31 is updated to $C_0+2$, showing that the number of pieces of transferable data is $C_0+2$. At time $T_3$, when a transfer request is sent out from the transfer destination device, the DMA transfer device 33 conducts DMA transfer of one piece of data, and +1 is added to the address counter 35 at the same time, while −1 is added to the word counter 36 and U/D counter 31. To the transfer request entered at time $T_4$, a similar process is applied, and the values of the counters become $C_0$, $A_0+2$, $W_0-2$ respectively. The value $C_0$ of the U/D counter means that there are $C_0$ pieces of transferable data at the time.

At time $T_n$, $T_{n+1}$, these data transfer processes are done, and the value of the U/D counter 31 has become zero. That is, in the case the values of the counters at time $T_n$ is 0, $A_1$, $W_1$ respectively and a transfer request is input at time $T_{n+1}$, the transfer control circuit 34 does not start the DMA action in accordance with the signal from the zero-detect circuit 32, and the transfer request is retained.

Thus, according to this invention, without using FIFO memory or the like, a specific data train may be set in a transferable state simultaneously with its generation by the combined structure of a relatively simple control circuit and a conventional DAM transfer device. In other words, by adding a little hardware to the conventional DMA transfer device, a combined state of data transfer destination device and FIFO memory may be realized.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A data-transfer device for transferring data between a memory and a target device, sharing said memory with a processor through a common bus, comprising:

an address counter means for storing an address counter value and for generating a same sequence of addresses that said processor generates when said processor stores data to be transferred to said memory;

an input means for receiving a signal outputted from said processor synchronously with a storing of data to be transferred into said memory and for prompting an incremental change of said address counter value;

a DMA-transfer device having a transfer-control circuit, a source-address counter means for storing a source-address counter value and for generating a same sequence of addresses as said address counter means and for incrementally varying said source-address counter value in accordance with a signal received from said transfer-control circuit, and a data-transfer request input means for receiving a signal outputted from said processor through another dedicated signal line and for indicating one of a permission and a prohibition to use said bus to said DMA-transfer device; and a comparator means, having as inputs an output of said address counter means and an output of said source-address counter means, for comparing said address counter value and said source-address counter value, and for outputting to said transfer control circuit a compared value in accordance with the thus compared address counter value and source-address counter value;

wherein said transfer-control circuit executes transfer of data pointed by said source-address counter means from said memory to said target device and updates said source-address counter value when said data-transfer request input means indicates a permission to use said bus and said compared value indicates that said address counter value and said source-address counter value are unequal values, and wherein said transfer-control circuit retains transfer of data when said data-transfer request input means indicates a prohibition to use said bus or when said compared value indicates that said address counter value and said source-address counter value are equal values.

2. A data transfer device for transferring data between a memory and a target device, sharing said memory with a processor through a common bus, comprising:

an address-latch having means for connection to said bus and receiving address signals from said bus;

an input means connected to said address-latch for receiving a signal outputted from said processor synchronously with a storing of data to be transferred into said memory and for prompting a latching of address signals on said bus;

a DMA-transfer device having a transfer-control circuit, a source-address counter means for storing a source-address counter value and for generating a same sequence of addresses that said processor generates when said processor stores data to be transferred into said memory and for incrementally varying said source-address counter value in accordance with a signal received from said transfer-control circuit, and a data-transfer request input means for receiving a signal outputted from said processor through another dedicated signal line and for indicating one of a permission and a prohibition to use said bus to the DMA-transfer device; and a comparator means, having as inputs an output of said address-latch and an output of said source-address counter means, for comparing a value of said address-latch and said source-address counter value, and for outputting to said transfer control circuit a compared value in accordance with the thus compared value of said address-latch and source-address counter value;

wherein said transfer-control circuit executes transfer of data pointed by said source-address counter means from said memory to said target device and updates said source-address counter value when said data-transfer request input means indicates a permission to use said bus and said compared value indicates that said value of said address-latch and said source-address counter value are unequal values, and wherein said transfer-control circuit retains transfer of data when said data-transfer request input means indicates a prohibition to use said bus or when said compared value indicates that said value of said address-latch and said source-address counter value are equal values.

3. A data transfer device for transferring data between a memory and a target device, sharing said memory with a processor through a common bus, comprising:

an up-down counter means having a zero detector;

an input means for receiving a signal outputted by said processor synchronously with a storing of data to be transferred into said memory and for prompting an incremental change in a value of said up-down counter means; and a DMA-transfer device having a transfer-control circuit, a source-address counter means for storing a source-address counter value and for generating a same sequence of addresses that said processor generates when said processor stores data to be transferred to said memory and for incrementally varying said source-address counter value in accordance with a signal received from said transfer-control circuit, and a data-transfer request input means for receiving a signal outputted from said processor and for indicating one of a permission and a prohibition to use said bus to said DMA-transfer device;

wherein an output of said zero detector is connected to said transfer control circuit, and wherein an output of said transfer control circuit is connected to said up-down counter;

wherein said transfer control circuit executes transfer of data pointed by said source-address counter means from said memory to said target device and changes a value of said up-down counter means when said data-transfer request input means indicates a permission to use said bus and an output value of said zero detector is false, and wherein said transfer control circuit retains transfer of data when said data-transfer request input means indicates a prohibition to use said bus or when said output value of said zero detector is true.

* * * * *